(12) United States Patent
Fukunaga et al.

(10) Patent No.: US 7,496,034 B2
(45) Date of Patent: Feb. 24, 2009

(54) PACKET PROCESSING DEVICE IMPLEMENTING SCHEDULING AND PRIORITY FOR IMPROVED EFFICIENCY

(75) Inventors: Hideyo Fukunaga, Yokohama (JP); Katsumi Imamura, Yokohama (JP); Yasushi Kurokawa, Yokohama (JP); Hideyuki Kudou, Yokohama (JP); Yoko Watanabe, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 548 days.

(21) Appl. No.: 11/077,868

(22) Filed: Mar. 11, 2005

(65) Prior Publication Data

US 2006/0098648 A1 May 11, 2006

(30) Foreign Application Priority Data

Nov. 5, 2004 (JP) ............................. 2004-321482

(51) Int. Cl.
*H04L 12/56* (2006.01)
(52) U.S. Cl. ................................... 370/230; 370/395.42
(58) Field of Classification Search ................ 370/412, 370/229, 230, 395.4, 395.42, 395.7, 395.72, 370/395.71
See application file for complete search history.

(56) References Cited

U.S. PATENT DOCUMENTS 6,560,233 B1 * 5/2003 Hatanaka et al. ............ 370/401
6,977,941 B2 * 12/2005 Takahashi et al. ........... 370/412
7,254,139 B2 * 8/2007 Benayoun et al. ........... 370/413
2002/0176429 A1 * 11/2002 Calvignac et al. ........... 370/411

FOREIGN PATENT DOCUMENTS

| JP | 2-142244 | 5/1990 |
| JP | 11-261649 | 9/1999 |
| JP | 2002-152247 | 5/2002 |
| JP | 2002-185495 | 6/2002 |

* cited by examiner

*Primary Examiner*—Kwang B. Yao
*Assistant Examiner*—Adam Duda
(74) *Attorney, Agent, or Firm*—Katten Muchin Rosenman LLP

(57) ABSTRACT

A packet transmission device improved in packet transmission efficiency. Each packet input processor generates a pointer and identifies a packet type with respect to a received packet, and generates identification data including the pointer and the packet type identification result. A memory access controller detects a header readout amount of the packet based on the packet type identification result, generates first readout data including the header readout amount and a readout pointer indicative of a storage location of the packet in a shared memory, and adaptively reads out header data of the packet from the shared memory in accordance with the first readout data. A protocol processor analyzes the destination of the read header data, and a packet updater updates the old destination address of the packet to a new one to generate a packet with the updated destination address, and outputs the generated packet.

5 Claims, 11 Drawing Sheets

PACKET PROCESSING DEVICE IMPLEMENTING SCHEDULING AND PRIORITY FOR IMPROVED EFFICIENCY

CROSS-REFERENCE TO RELATED APPLICATIONS

This application is based upon and claims the benefits of priority from the prior Japanese Patent Application No. 2004-321482, filed on Nov. 5, 2004, the entire contents of which are incorporated herein by reference.

BACKGROUND OF THE INVENTION

1. Field of the Invention

The present invention relates to packet transmission devices, and more particularly, to a packet transmission device for switching packets for transmission.

2. Description of the Related Art

As information communication networks become multimedia-oriented, growing importance has come to be placed on routers which interconnect different networks to allow communication between nodes. Also, various types of packets travel over networks and thus routers for switching such packets are required to have higher performance as well as higher functionality.

The performance of a router is expressed as the number of packets that can be processed per unit time, and the greater the number of processed packets, the higher performance the router has. Also, a router capable of processing a wider range of packet types is regarded as having higher functionality (packet types include, for example, L2 (Layer 2) packet, IPv4 packet, IPv6 packet, etc.).

FIG. 10 shows the configuration of a conventional router. The router 60 comprises a receiving interface (I/F) 61, a memory 62, a protocol processor 63, an updater 64, and a transmitting interface (I/F) 65. The receiving interface 61 takes care of interfacing with incoming packets, and the memory 62 stores the received packets.

The protocol processor 63 reads out and analyzes the header (header data) of a packet stored in the memory 62, and determines a new destination address to which the packet is to be forwarded from the router 60.

The updater 64 reads out a packet from the memory 62 and updates the old destination address of the packet to the new one determined by the protocol processor 63. The transmitting interface 65 takes care of interfacing with outgoing packets whose destination addresses have been updated. In this manner, the router 60 determines new destination addresses for received packets and updates the old destination addresses to the new ones, thereby switching the packets to be forwarded to their respective destinations.

As packet processing techniques for conventional routers, there has been proposed a concurrent processing technique whereby the retrieval of a destination address of a packet header is performed concurrently with a packet transmission process (e.g., Unexamined Japanese Patent Publication No. H11-261649 (paragraph nos. [0007] to [0009], FIG. 1)).

In the aforementioned router 60, the protocol processor 63 reads out the header data of a packet from the memory 62 and then analyzes the header data to determine a new destination address. In this case, a fixed length of data is read from the memory 62 to retrieve the header data.

FIG. 11 illustrates a problem with the conventional router 60. Packets p1 to p3 are stored in the memory 62. The packet p1 has a-byte header data h1, the packet p2 has b-byte header data h2, and the packet p3 has c-byte header data h3. The header data lengths are in the relationship of c<b<a.

Let it be assumed that the router 60 can process these three types of packets p1 to p3. In the conventional router, a fixed length of data is read out to retrieve the header data, and therefore, the protocol processor 63 must always read out a maximum length of a bytes from the memory 62 when analyzing the destination.

Namely, when the header data is read from the memory 62, data corresponding to the fixed length of a bytes is always read out irrespective of the types of packets p1 to p3 having different header lengths. With respect to the packets p2 and p3, therefore, a portion of the payload is also read out and is discarded by the protocol processor 63 as data unnecessary for the destination analysis.

Thus, in the conventional router, a fixed length of data is read out to retrieve the header data. Consequently, with regard to packets with headers shorter than the fixed length, up to an unnecessary data area including the payload is accessed, which lowers the processing performance and entails inefficiency.

To avoid lowering in the processing performance, a fixed length may be set with respect to each of different header data lengths of packets. With this method, however, there arises constraints on the types of routers that can be used, depending on packet types, and this hinders the router functionality from being enhanced such that a single router can process a plurality of different types of packets.

According to the aforementioned conventional technique (Unexamined Japanese Patent Publication No. H11-261649), a packet memory for storing received packets in their entirety and a header memory for storing only the header data of the packets are provided separately from each other, and during the destination analysis of the header data read from the header memory, a different packet is read from the packet memory for transmission. However, since the memory for storing only the header data needs to be separately provided, the scale of circuitry as well as the power consumption increase.

SUMMARY OF THE INVENTION

The present invention was created in view of the above circumstances, and an object thereof is to provide a packet transmission device which is improved in the efficiency of accessing memory to read out header data for destination analysis, thereby improving the packet transmission efficiency.

To achieve the object, there is provided a packet transmission device for switching packets for transmission. The packet transmission device comprises a memory including a shared memory for storing packets according to pointers, a plurality of packet input processors associated with respective input ports, a scheduler, a protocol processor, and a packet updater. Each packet input processor generates a pointer and identifies a packet type with respect to a packet received via the corresponding input port, and generates identification data including the generated pointer and a result of the packet type identification. The scheduler includes an identification data controller for receiving the identification data and selecting identification data of highest priority, a transmission information controller for receiving transmission information and selecting transmission information of highest priority, and a memory access controller. The memory access controller is adapted to detect a header readout amount of the packet based on the packet type identification result in the selected identification data, generate first readout data including the header readout amount and a readout pointer indicative of a storage location of the packet in the shared memory, and adaptively read out header data of the packet from the shared memory in accordance with the first readout data, or is adapted to generate, based on the selected transmission information, second readout data including the readout pointer and a readout instruction to read out the whole packet, and read out the packet from the shared memory in accordance with the second readout data. The protocol processor analyzes a destination of the read header data to determine a new destination address for the packet, generates the transmission information including the readout pointer and the new destination address, and sends the transmission information to the scheduler. The packet updater updates an old destination address of the packet read from the shared memory to the new destination address in accordance with the transmission information, to generate a packet with the updated destination address, and outputs the generated packet.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
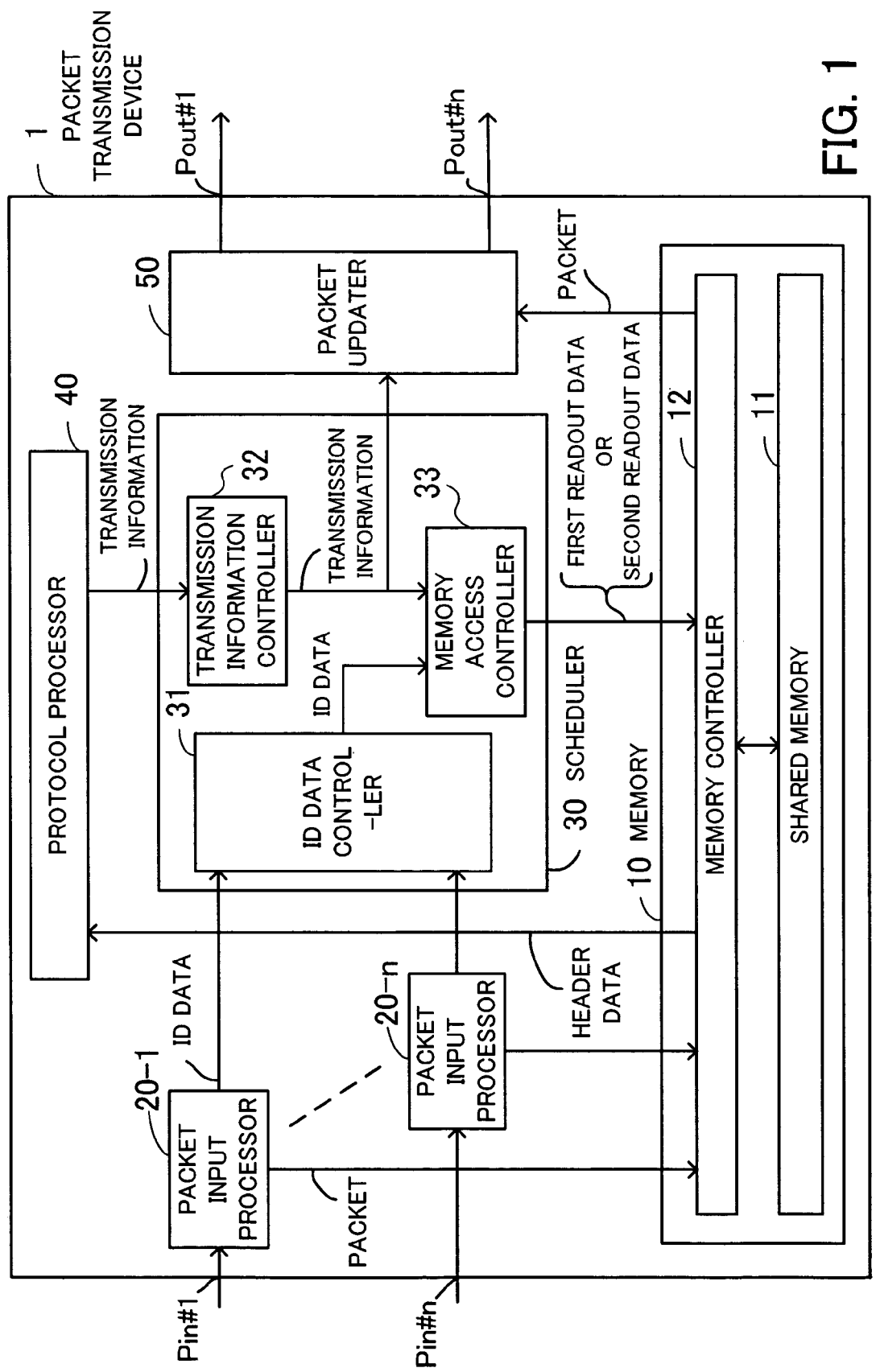
FIG. 1 illustrates the principle of a packet transmission device.

Preferred embodiments of the present invention will be described below with reference to the accompanying drawings. FIG. 1 illustrates the principle of a packet transmission device. The packet transmission device 1 comprises a memory 10, packet input processors 20-1 to 20-n, a scheduler 30, a protocol processor 40 and a packet updater 50, and is a device for switching packets for transmission.

The memory 10 includes a shared memory 11 and a memory controller 12. The shared memory 11 stores packets, and the memory controller 12 accesses the shared memory 11 in accordance with a pointer (corresponding to a storage address of the shared memory 11) to write/read data into/from the shared memory 11.

The packet input processors 20-1 to 20-n, which are associated with input ports Pin#1 to Pin#n, respectively, generate pointers for packets received via the respective input ports Pin#1 to Pin#n and write the packets into the shared memory 11 according to the respective pointers (for each of the packets, a storage address (pointer) in the shared memory 11 is determined and the packet is written at the determined storage address).

Also, each packet input processor identifies the packet type of a received packet (e.g., determines whether the received packet is an IPv4 packet or an L2 packet) and generates identification (ID) data including the pointer and the result of the packet type identification.

The scheduler 30 includes an identification (ID) data controller 31, a transmission information controller 32, and a memory access controller 33. The identification data controller 31 receives the identification data from the packet input processors 20-1 to 20-n, and selects and outputs identification data of highest priority. The transmission information controller 32 receives transmission information from the protocol processor 40, and selects and outputs transmission information of highest priority.

The memory access controller 33 determines a header readout amount for a packet of which the destination is to be analyzed, on the basis of the packet type identification result in the identification data selected by the identification data controller 31.

Then, the memory access controller 33 generates first readout data including the header readout amount and a readout pointer indicative of the storage location of the packet in the shared memory 11, and adaptively reads out the header data of the packet whose destination is to be analyzed, from the shared memory 11 in accordance with the first readout data (in an adaptive manner so as to match the header length of each packet type).

Also, based on the transmission information selected by the transmission information controller 32, the memory access controller 33 generates second readout data including the readout pointer indicative of the storage location of the analyzed packet in the shared memory 11 and a readout instruction to read out the whole packet, and reads out the analyzed packet from the shared memory 11 in accordance with the second readout data.

The protocol processor 40 analyzes the destination of the header data read from the shared memory 11 to determine a new destination address for the packet, generates transmission information including the readout pointer and the new destination address, and sends the generated transmission information to the scheduler 30.

The packet updater 50 receives the transmission information output from the scheduler 30. Then, in accordance with the transmission information, the packet updater 50 updates the old destination address of the packet (analyzed packet) read from the shared memory 11 to the new destination address, to generate a packet with the updated destination address, and outputs the packet from a corresponding one of output ports Pout#1 to Pout#n.

Figure 2:
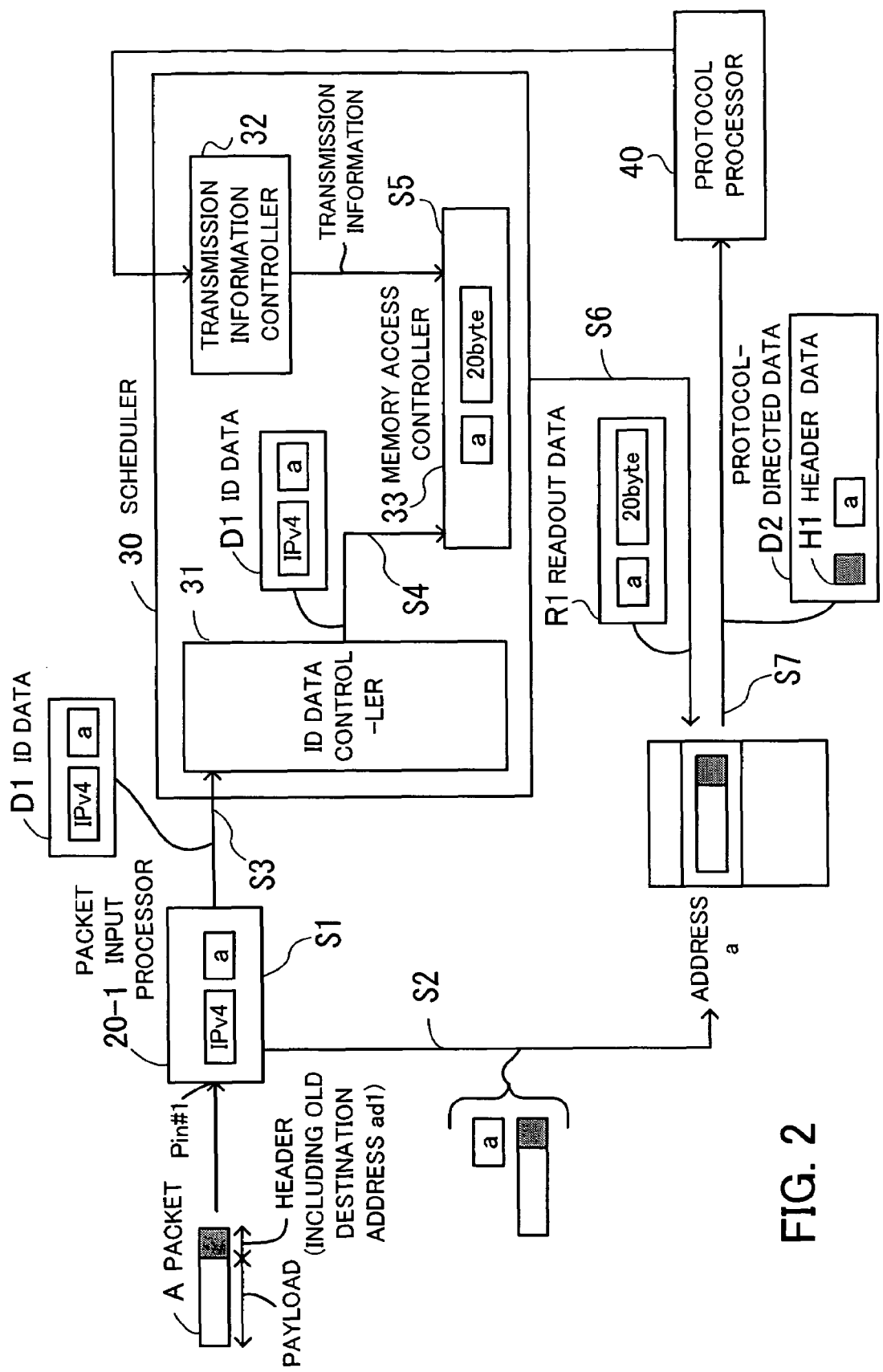
FIG. 2 illustrates a sequence of operations from the reception of a packet via an input port to the readout of header data.
Figure 3:
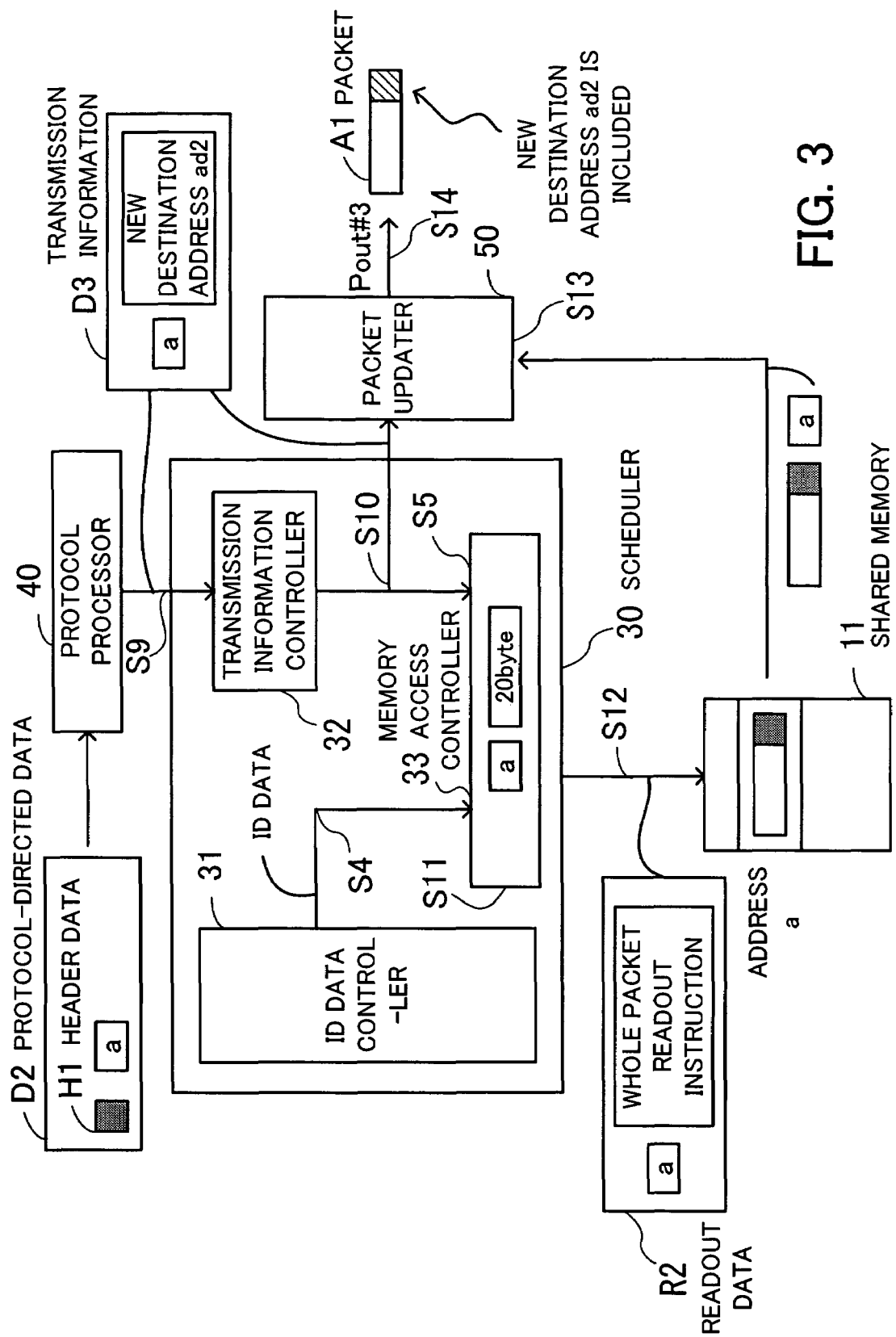
FIG. 3 illustrates a sequence of operations from the destination analysis of the header data to the packet updating.

Referring now to FIGS. 2 and 3, operation of the device will be explained in detail. FIG. 2 illustrates a sequence of operations from the reception of a packet from the input port Pin#1 to the readout of the header data, wherein only the elements necessary for the explanation are shown. Also, the following explains the case where an old destination address ad1 of a packet A of IPv4 type (header length=20 bytes) is updated to a new destination address ad2.

[S1] The packet input processor 20-1 receives the packet A from the input port Pin#1 and generates a readout pointer a which is a storage address of the shared memory 11 where the packet A is to be stored. Also, the packet input processor 20-1 identifies the packet type of the packet A as IPv4 type.

[S2] The packet input processor 20-1 writes the packet A in the shared memory 11 according to the readout pointer a.

[S3] The packet input processor 20-1 generates identification data D1 ("pointer a"+"identification result=IPv4 packet") and sends the generated data to the identification data controller 31 of the scheduler 30.

[S4] The identification data controller 31 selects identification data of highest priority, from among a plurality of identification data sent from the multiple packet input processors 20-1 to 20-n, and outputs the selected identification data to the memory access controller 33. It is assumed here that the identification data D1 is selected and output.

[S5] The memory access controller 33 receives the identification data D1 as well as the transmission information sent from the transmission information controller 32, and performs arbitration to determine which data is to be processed. It is assumed here that the identification data D1 is processed. In this case, since the identification data D1 shows that the packet type is IPv4, the memory access controller 33 judges the header readout amount to be 20 bytes, and generates readout data R1 ("readout pointer a"+"header readout amount=20 bytes") corresponding to the first readout data.

[S6] The memory access controller 33 sends the readout data R1 to the shared memory 11 to read out corresponding header data H1 (20 bytes).

[S7] The header data H1 (20 bytes) of the packet A is read from the shared memory 11, and information (hereinafter referred to as protocol-directed data D2) including the header data H1 and the readout pointer a is sent to the protocol processor 40.

FIG. 3 illustrates a sequence of operations from the destination analysis of the header data H1 to the packet updating, wherein only the elements necessary for the explanation are shown.

[S9] On receiving the protocol-directed data D2, the protocol processor 40 analyzes the destination of the header data H1 included in the protocol-directed data D2, to obtain a new destination address ad2. Then, the protocol processor 40 generates transmission information D3 ("readout pointer a"+"new destination address ad2") and sends the generated information to the transmission information controller 32.

[S10] The transmission information controller 32 selects transmission information of highest priority, from among the multiple items of transmission information stored therein, and outputs the selected transmission information to the memory access controller 33 and the packet updater 50. It is assumed here that the transmission information D3 is selected and output (the transmission information controller 32 has queues therein allotted to respective priority levels and outputs the transmission information stored in the highest-priority queue first).

[S11] The memory access controller 33 receives the identification data as well as the transmission information D3 sent from the transmission information controller 32, and performs arbitration to determine which data is to be processed. It is assumed here that the transmission information D3 is processed. In this case, the memory access controller 33 generates and outputs readout data R2 ("readout pointer a"+"whole packet readout instruction") corresponding to the second readout data.

[S12] The memory access controller 33 sends the readout data R2 to the shared memory 11 to read out the packet A.

[S13] The packet updater 50 receives the packet A read from the shared memory 11 as well as the readout pointer a, and further receives the transmission information D3 ("readout pointer a"+"new destination address ad2"). Based on the readout pointer a, the packet updater 50 identifies the packet A as a packet to be updated, and thus updates the old destination address ad1 included in the header of the packet A to the new destination address ad2 to generate a new packet A1.

[S14] The packet updater 50 sends out the packet A1 with the updated address from the output port (assumed to be the output port Pout#3) corresponding to the new destination address ad2.

Figure 4:
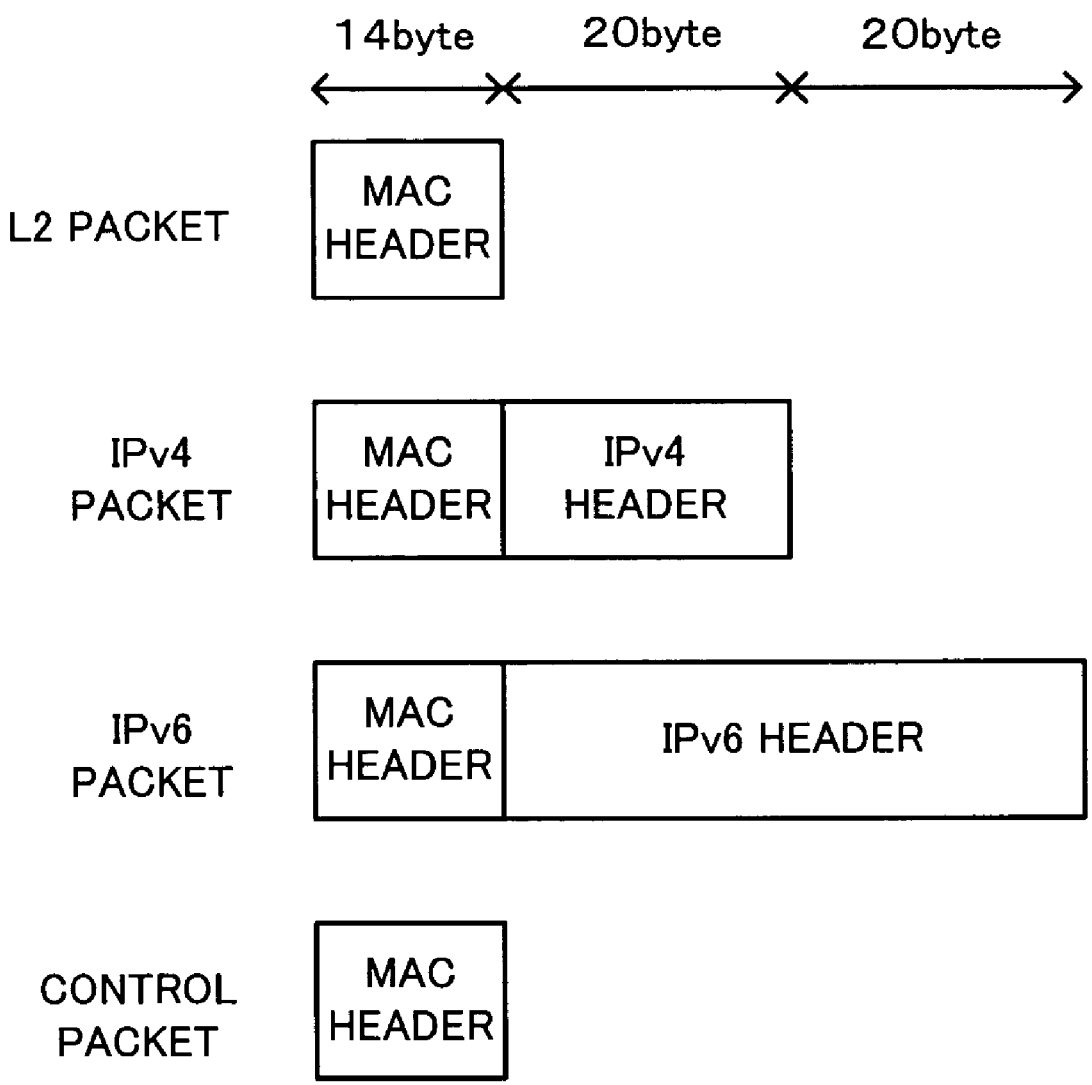
FIG. 4 shows packet header formats.

Headers of individual packet types will be now explained. FIG. 4 shows packet header formats, and as illustrated, an L2 packet has a 14-byte MAC header. An IPv4 packet has a header length of 34 bytes which is the sum of a MAC header (14 bytes) plus an IPv4 header (20 bytes), and an IPv6 packet has a header length of 54 bytes which is the sum of a MAC header (14 bytes) plus an IPv6 header (40 bytes). A control packet has a 14-byte MAC header.

Figure 5:
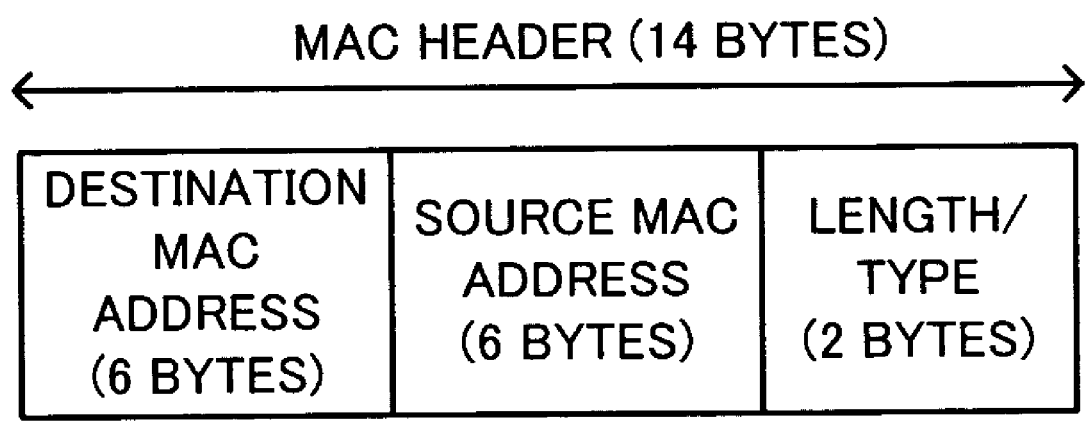
FIG. 5 shows in detail a packet header format.
Figure 6:
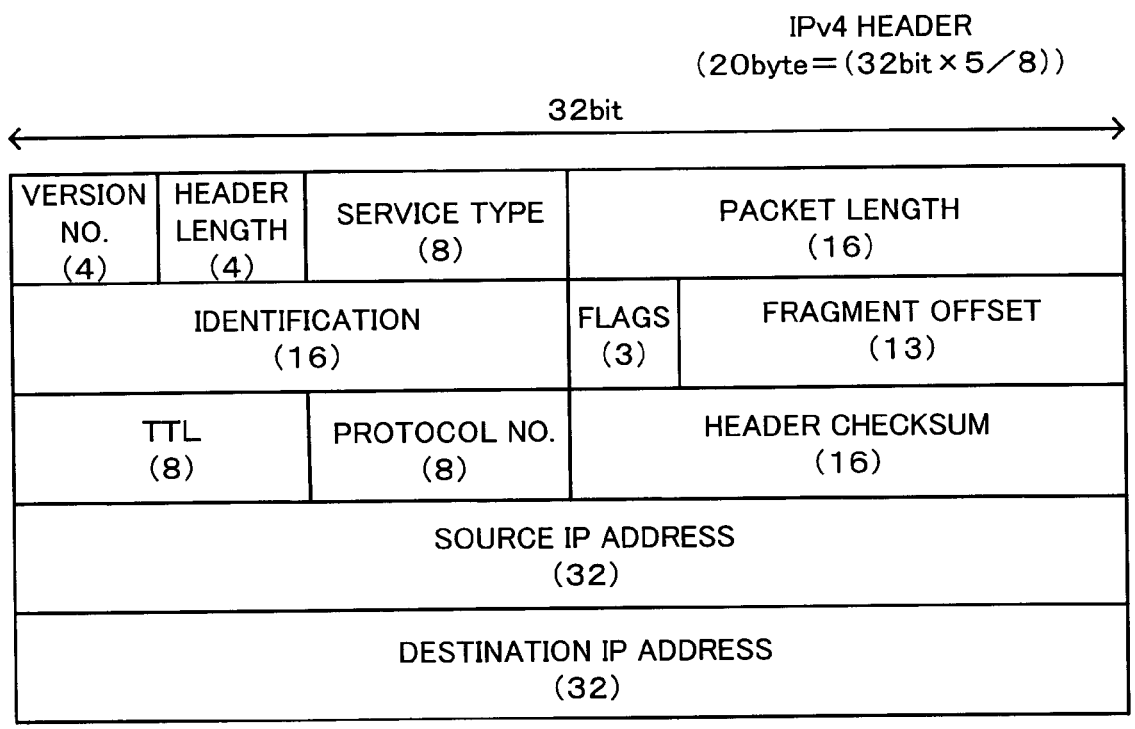
FIG. 6 shows in detail another packet header format.
Figure 7:
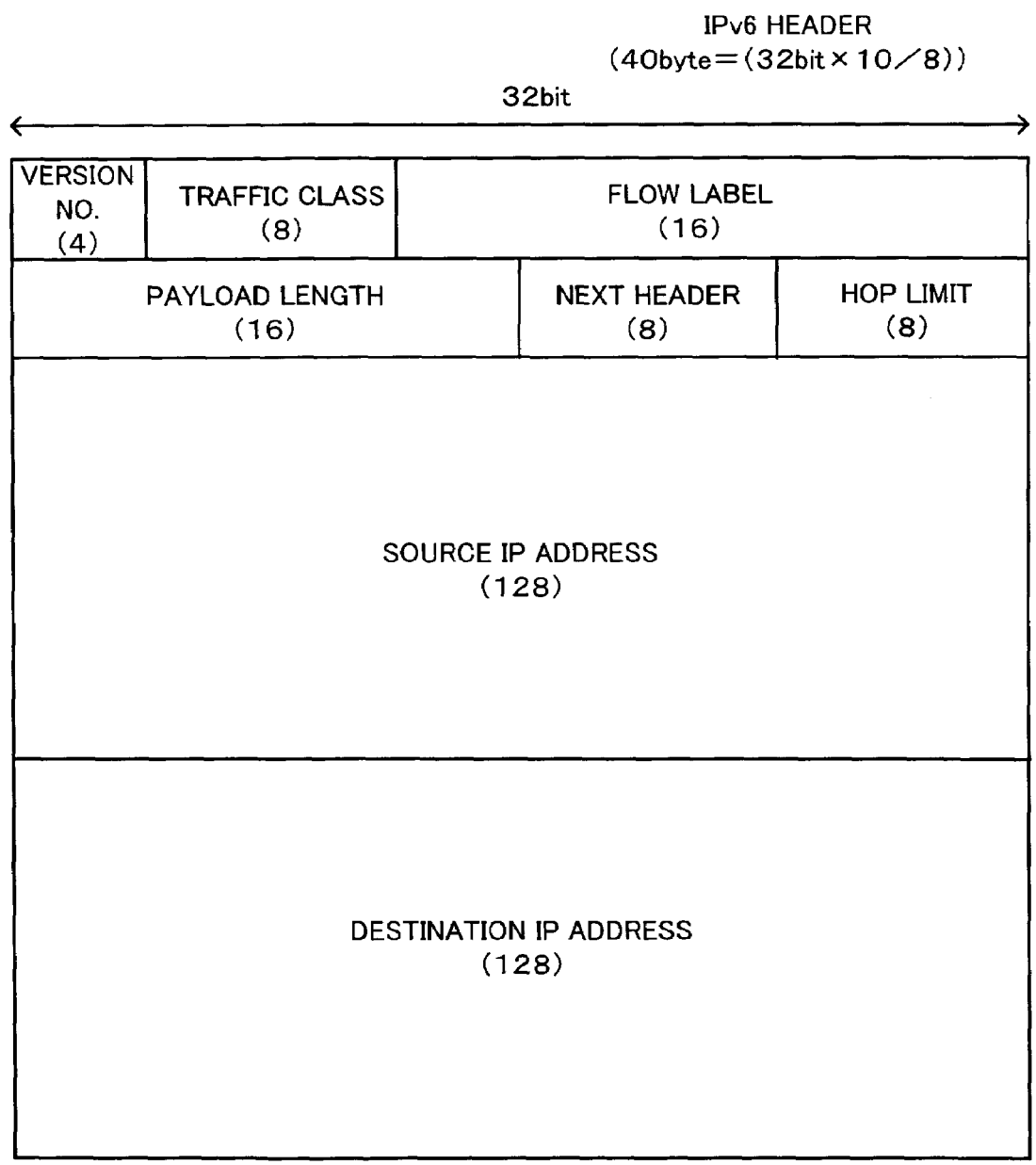
FIG. 7 shows in detail still another packet header format.

FIGS. 5 to 7 show details of the packet header formats, wherein FIG. 5 shows the MAC header format, FIG. 6 shows the IPv4 header format, and FIG. 7 shows the IPv6 header format. The preamble (7 bytes) and SFD (1 byte) of the MAC header are not shown in FIG. 5 because they are unnecessary for the address resolution (also, explanation of individual fields of the headers is omitted).

The packet input processors 20-1 to 20-n each identify the packet type of a packet received via the corresponding one of the input ports Pin#1 to Pin#n. Based on the identification data, the memory access controller 33 judges the header readout amount to be 14 bytes if the packet type is L2 packet, or 34 bytes if the packet type is IPv4 packet, or 54 bytes if the packet type is IPv6 packet, or 14 bytes if the packet type is control packet.

In FIGS. 5 to 7, the option field and extension field included in the headers are omitted. When a packet using these fields is received, each of the packet input processors 20-1 to 20-n identifies the lengths of the fields, besides the packet type, and notifies the memory access controller 33 of the identification results. The memory access controller 33 then determines a header readout amount from the ordinary header length of the corresponding packet type and from the length of the option field (or extension field).

In the foregoing embodiment, the packet type is identified by the packet input processors 20-1 to 20-n and the header readout amount is determined by the memory access controller 33. Alternatively, the packet input processors 20-1 to 20-n may access the header length field in the header and notify the memory access controller 33 of the data obtained.

Figure 8:
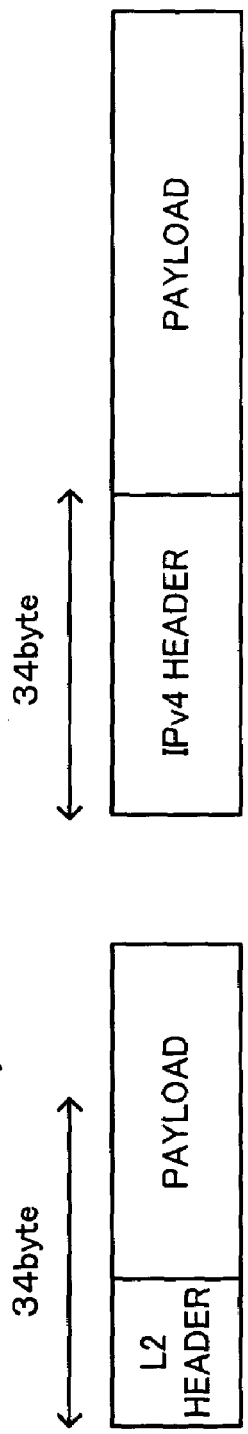
FIG. 8 shows the manner of how header data is read from memory.
Figure 8:
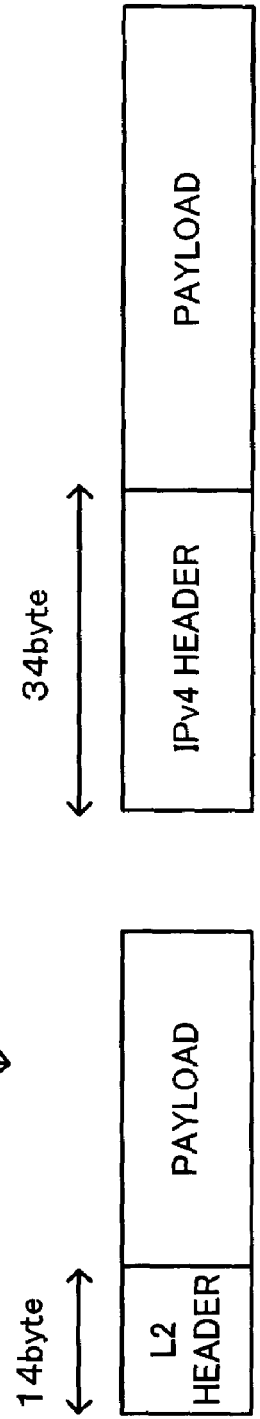

The memory access carried out in the aforementioned manner by the packet transmission device 1 provides the advantage explained below. FIG. 8 illustrates the manner of how the header data is read from the memory. In the conventional device, a fixed amount of data is read from the memory to retrieve the header data for the destination analysis.

Let us consider the case where the packet types to be handled are L2 packet and IPv4 packet, for example. An L2 packet has a header length of 14 bytes while an IPv4 packet has a header length of 34 bytes, and accordingly, in the conventional device, data corresponding to the maximum length of 34 bytes is read from the memory, as indicated by 2a illustrating the conventional data read. Thus, 34-byte data is read from an L2 packet, so that an unnecessary area including the payload is accessed.

In the packet transmission device 1, on the other hand, a header readout amount matching the received packet is determined before reading out the header data. For example, as indicated by 2b illustrating the data read by the packet transmission device 1, 14-byte header data is read from an L2 packet whereas 34-byte header data is read from an IPv4 packet. This eliminates unnecessary data read, making it possible to improve the memory access efficiency.

The above advantage will be now explained using specific numerical values. Let it be assumed that the types of packets of which the destinations are to be analyzed are L2 packet, IPv4 packet, IPv6 packet, and control packet. These packets have the respective header lengths shown in FIG. 4.

Let us consider the case where the device capable of handling these four packet types shown in FIG. 4 updates an L2 packet having a packet length of 64 bytes, for example. In the conventional device, the header readout amount is fixed, and accordingly, a fixed data amount of 54 bytes, which is a maximum header length among the four packet types, is read from the L2 packet for destination analysis.

Subsequently, the L2 packet of 64 bytes long is read out and the destination address thereof is updated. Thus, in the conventional device, a data amount of 118 bytes, which is the sum of the header length (54 bytes) plus the packet length (64 bytes), needs to be read out to process a single L2 packet.

On the other hand, in the packet transmission device 1, only the 14-byte header of the L2 packet is read out first for destination analysis and then the 64-byte L2 packet is read out to update its destination address. In the case of the packet transmission device 1, therefore, a data amount of 78 bytes, which is the sum of the header length (14 bytes) plus the packet length (64 bytes), needs to be read out to process a single L2 packet.

Where the shared memory is capable of processing at 100 Mbps, for example, the above difference results in the following difference in performance: The conventional device has a processing performance of about 105,932 packets ($\approx$100 Mbps/(118 bytes×8 bits)), while the packet transmission device 1 has a processing performance of about 160,256 packets ($\approx$100 Mbps/(78 bytes×8 bits)) thus can be expected to provide a processing speed which is about 1.6 times as high as that of the conventional device.

Figure 9:
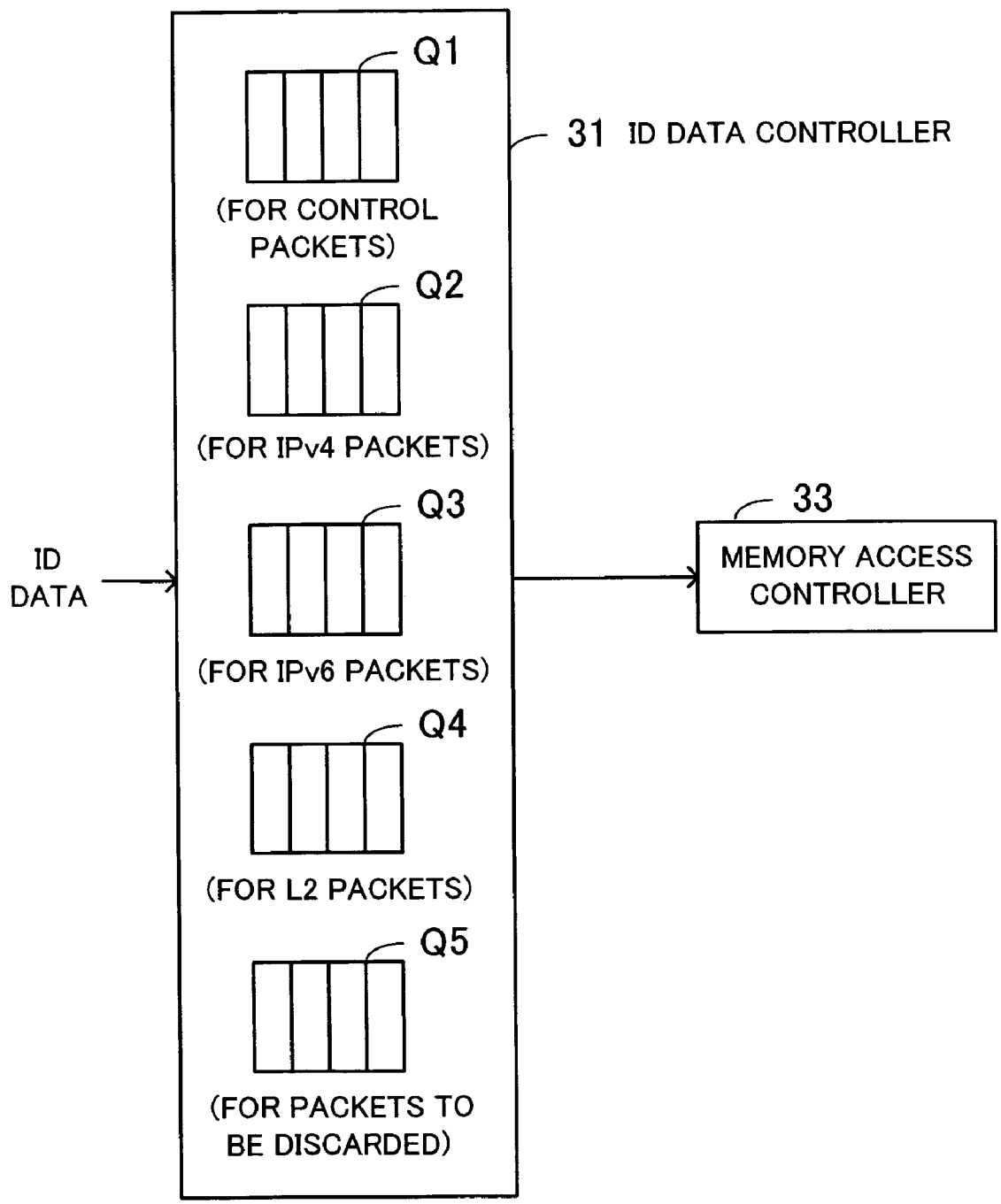
FIG. 9 shows the configuration of an identification data controller.
Figure 10:
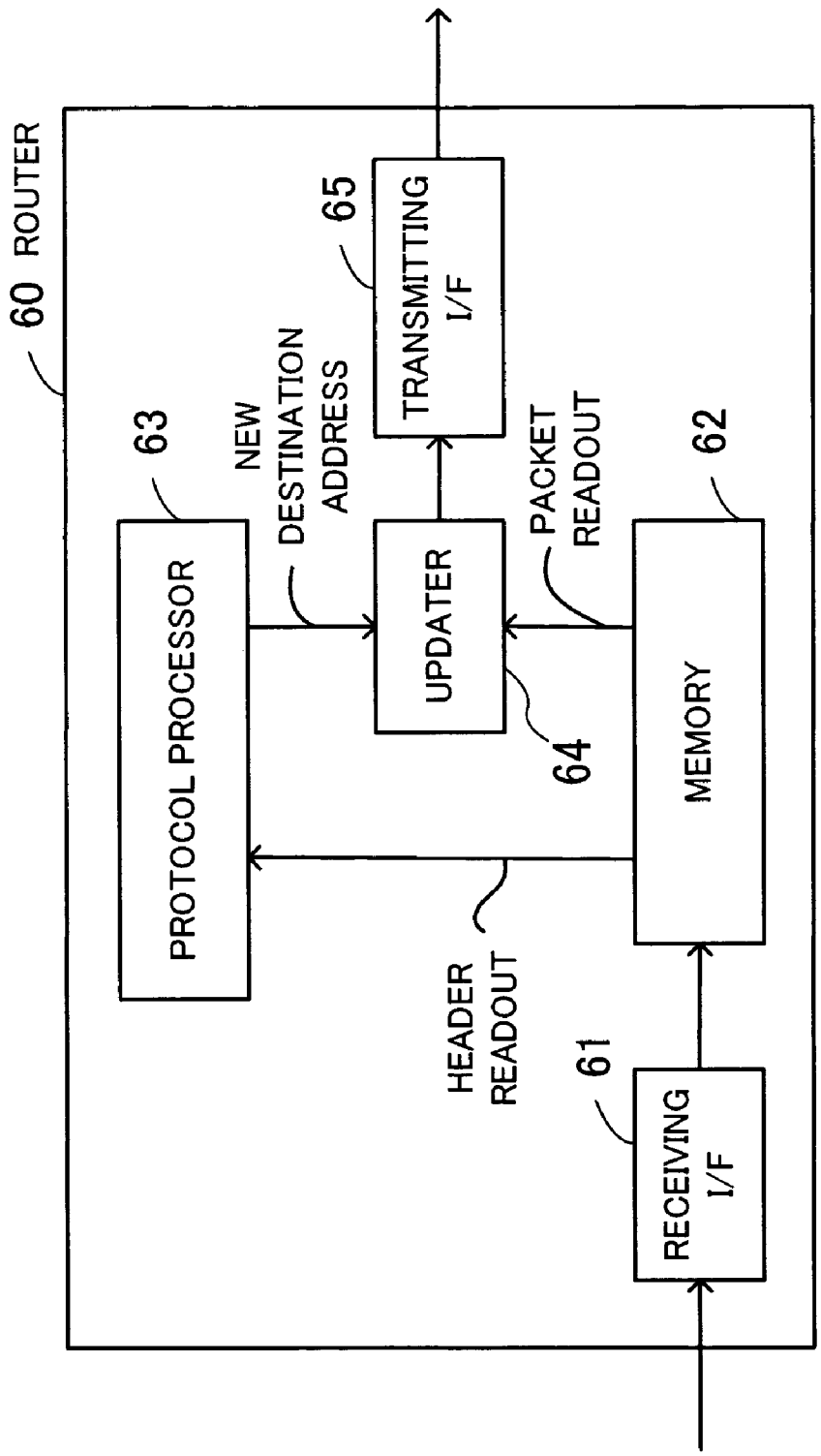
FIG. 10 shows the configuration of a conventional router.
Figure 11:
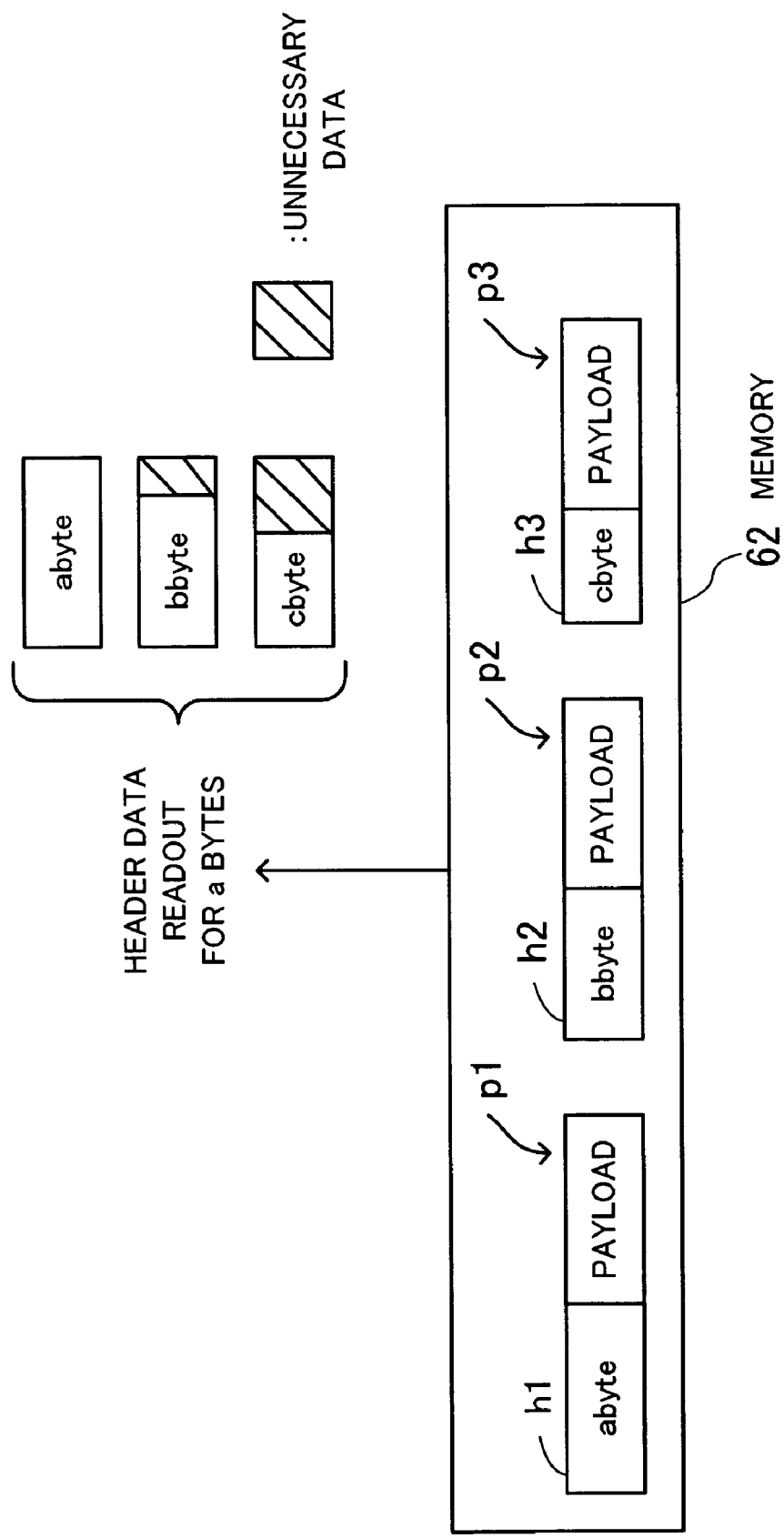
FIG. 11 illustrates a problem with the conventional router.

The identification data controller 31 in the scheduler 30 will be now explained. FIG. 9 shows the configuration of the identification data controller 31, and as illustrated, the controller 31 has queues for storing the identification data for the respective packet types.

The illustrated example includes an identification data queue Q1 for control packets, an identification data queue Q2 for IPv4 packets, an identification data queue Q3 for IPv6 packets, an identification data queue Q4 for L2 packets, and an identification data queue Q5 for packets to be discarded.

These queues store the identification data of the respective packets (e.g., the identification data queue Q1 for control packets stores the identification data of which the packet type has been identified as control packet by the packet input processors).

The identification data controller 31 selects first the identification data stored in the queue associated with the packet type of which the priority of destination analysis is highest, and outputs the selected identification data to the memory access controller 33. For example, if the usage frequencies (priority levels) of packets are in the order: control packet>IPv4 packet>L2 packet>IPv6 packet, the identification data stored in the identification data queue Q1 for control packets is selected and output first, and the identification data stored in the identification data queue Q3 for IPv6 packets is lowest in priority.

The memory access controller 33 then generates the readout data R1 based on the selected identification data to read out the corresponding header data from the shared memory 11. The selection of the queues may be controlled according to round robin etc.

The identification data queue Q5 for packets to be discarded stores the identification data of packet types which the packet input processors have identified as packets to be discarded. The identification data queue Q5 stores the pointers of packets to be discarded and does not output the data therein to the memory access controller 33. This prevents the packets to be discarded from being read out of the shared memory 11, making it possible to eliminate unnecessary memory access.

In the above embodiment, priority control is performed on the multiple queues provided in the identification data controller 31. Alternatively, as multiple items of identification data are received from the packet input processors 20-1 to 20-n, the received identification data may be multiplexed in order of arrival, for example, and may be successively output to the memory access controller 33 so that priority control may be performed in the memory access controller 33.

Also, priority levels may be set for the respective input ports Pin#1 to Pin#n. In this case, the identification data controller 31 selects first the identification data input from the packet input processor associated with the input port of highest priority level, and outputs the selected identification data to the memory access controller 33.

For example, let us suppose the case where the input port Pin#1 is input with video data (large amount of information is continuously input), the input port Pin#2 is input with voice data (small amount of information is continuously input), and the input port Pin#3 is input with computer data (small amount of information is intermittently input). In this case, the priority levels are set in the order: Pin#1>Pin#2>Pin#3, so that the identification data controller 31 may select first the identification data input from the packet input processor associated with the input port Pin#1 of highest priority level.

The packet type identification performed in the packet input processors 20-1 to 20-n will be now described. In the aforementioned packet type identification process, it is determined whether the received packet is a control packet, an IPv4 packet or other packets. Alternatively, the amount of information of received packets and the packet transmission interval may be detected for the purpose.

For example, in the case where the packets received from the input port Pin#1 carry a large amount of continuous information, the packet input processor 20-1 generates identification data indicative of the input of a large amount of continuous information. The identification data controller 31 then preferentially selects identification data indicating that the amount of information is large and that the packet transmission interval is continuous, and outputs the selected identification data to the memory access controller 33.

On the other hand, where the packets received from the input port Pin#1 carry a small amount of intermittent information, the packet input processor 20-1 generates identification data indicative of the input of a small amount of intermittent information. When selecting the identification data, the identification data controller 31 gives low priority to the identification data indicating that the amount of information is small and that the packet transmission interval is intermittent, and outputs the selected identification data to the memory access controller 33. Priority control may be carried out in this manner.

As described above, in the conventional device, a fixed amount of data must always be read from the shared memory to retrieve the header data of each packet, because the packet type is unknown. In the packet transmission device 1, the packet types of received packets are identified by the packet input processors 20-1 to 20-n, and accordingly, the protocol processor 40 can determine the amounts of header data that need to be retrieved from the respective packets for the destination analysis. This allows the scheduler 30 to read out only the amount of data necessary for the destination analysis from the shared memory 11.

Conventional devices adapted to receive a plurality of different types of packets are often associated with a bottleneck caused due to inefficient access to the shared memory. By contrast, the packet transmission device 1 controlled in the aforementioned manner can provide improved processing performance. Also, the packet transmission device 1 can be enhanced in functionality, because a single device can process a plurality of different packet types.

Further, compared with the conventional devices, the readout amount of header data directed to the protocol processor 40 can be reduced, and therefore, the processing time spent on reading out unnecessary data can be allocated to other processes, thus making it possible to improve the processing performance.

In the packet transmission device of the present invention, the header readout amount for a packet is determined in accordance with the packet type, the header data of the packet is adaptively read from the shared memory for the destination analysis, the whole packet is then read from the shared memory, and the old destination address is updated to a new destination address to generate a packet with the updated destination address. This permits the memory to be efficiently accessed when the header data is read out for the destination analysis, making it possible to improve the packet transmission efficiency.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their

What is claimed is:

1. A packet processing device implementing scheduling and priority for improved efficiency, comprising:
   a memory including a shared memory for storing packets according to pointers;
   a plurality of packet input processors #1 to #N (N=2, 3, 4, . . . ) associated with respective input ports Pin#1 to Pin#N (N=2, 3, 4, . . . ) for processing an input packet;
   a scheduler including an identification data controller, a transmission information controller and a memory access controller for scheduling a packet reading;
   a protocol processor for analyzing a destination address of a packet; and
   a packet updater for updating an old destination address of the packet to a new one to generate a packet with the updated destination address, and outputting the generated packet from a corresponding one of output ports Pout#1 to Pout#N (N=2, 3, 4, . . . );
   the packet input processor #k (1≦k≦N: k=1, 2, 3, . . . , N=2, 3, 4, . . . ) performing:
      (a1) receiving the packet (A) from the input port Pin#k and generating a readout pointer (a) which is a storage address of the shared memory where the packet (A) is to be stored,
      (a2) identifying the packet type of the packet (A),
      (a3) writing the packet (A) in the shared memory according to the readout pointer (a),
      (a4) generating identification data (D1) which includes the readout pointer (a) and the packet type, and sending the identification data (D1) to the identification data controller,
   the identification data controller performing:
      (b1) selecting identification data of highest priority, from among a plurality of identification data sent from the packet input processors #1 to #N (N=2, 3, 4 , . . . ),
      (b2) outputting the identification data (D1) to the memory access controller, when the identification data (D1) is selected,
   the memory access controller first performing:
      (c1) receiving the identification data (D1) and a transmission information sent from the transmission information controller,
      (c2) performing arbitration to determine which data is to be processed,
      (c3) judging header readout amount from the packet type included in the identification data (D1), when the identification data (D1) is determined,
      (c4) generating readout data (R1) which includes the readout pointer (a) and the header readout amount,
      (c5) sending the readout data (R1) to the shared memory to read out corresponding a header data (H1), the header data (H1) showing the header readout amount,
      (c6) reading the header data (H1) of the packet (A) from the shared memory and generating a protocol-directed data (D2) which includes the header data (H1) and the readout pointer (a),
   the protocol processor performing:
      (d1) receiving the protocol-directed data (D2) and analyzing the destination of the header data (H1) to obtain a new destination address,
      (d2) generating a transmission information (D3) which includes the readout pointer (a) and the new destination address, and sending the transmission information (D3) to the transmission information controller,
   the transmission information controller performing:
      (e1) selecting transmission information of highest priority, from among multiple items of transmission information stored therein,
      (e2) outputting the transmission information (D3) to the memory access controller and the packet updater, when the transmission information (D3) is selected,
   the memory access controller second performing:
      (f1) receiving the identification data and the transmission information (D3) sent from the transmission information controller,
      (f2) performing arbitration to determine which data is to be processed,
      (f3) generating and outputting a readout data (R2) which includes the readout pointer (a) and whole packet readout instruction, when the transmission information (D3) is determined,
      (f4) sending the readout data (R2) to the shared memory to read out the packet (A),
   the packet updater performing:
      (g1) receiving the packet (A) read from the shared memory and the transmission information (D3),
      (g2) identifying the packet (A) as a packet to be updated based on the readout pointer (a),
      (g3) updating the old destination address included in the header of the packet (A) to the new destination address to generate a new packet (A1),
      (g4) sending out the packet (A1) with the updated address from a corresponding output port Pout#m (1≦m≦N: m=1, 2, 3, . . . , N=2, 3, 4, . . . ).

2. The packet processing device according to claim 1, wherein the identification data controller has a plurality of queues for storing the identification data according to packet types, and selects first the identification data stored in the queue associated with a packet type of which priority of the destination analysis is highest.

3. The packet processing device according to claim 1, wherein the identification data controller has a queue associated with a packet to be discarded, the queue storing the pointer of the packet to be discarded so that the shared memory may not be accessed to read out the packet to be discarded.

4. The packet processing device according to claim 1, wherein priority levels are set for the respective input ports, and the identification data controller selects first the identification data received from the packet input processor associated with an input port of highest priority level.

5. The packet processing device according to claim 1, wherein each of the packet input processors generates identification data including, as the packet type identification result, detection results of an amount of information of a received packet and a packet transmission interval, and the identification data controller preferentially selects the identification data indicating that the amount of information is large and that the packet transmission interval is continuous.

* * * * *